United States Patent [19]
Schuette et al.

[11] Patent Number: 5,250,278
[45] Date of Patent: * Oct. 5, 1993

[54] METHOD FOR PRODUCING A CERAMIC PRODUCT

[75] Inventors: George F. Schuette; Bruce W. Gerhold, both of Bartlesville, Okla.

[73] Assignee: Phillips Petroleum Company, Bartlesville, Okla.

[*] Notice: The portion of the term of this patent subsequent to Apr. 28, 2009 has been disclaimed.

[21] Appl. No.: 717,596

[22] Filed: Jun. 19, 1991

[51] Int. Cl.$^5$ .................. C01B 31/36; C01B 21/068
[52] U.S. Cl. ............................ 423/346; 423/344; 423/380; 423/382; 501/92; 501/88
[58] Field of Search ............ 423/344, 345, 346, 365, 423/380, 382; 501/88, 92

[56] References Cited

U.S. PATENT DOCUMENTS

| | | | |
|---|---|---|---|
| 3,855,395 | 12/1974 | Cutter | 423/344 |
| 4,388,255 | 6/1983 | Simpson | 264/29.1 |
| 4,525,335 | 6/1985 | Tanaka et al. | 423/344 |
| 4,530,825 | 7/1985 | Johansson | 423/344 |
| 4,594,330 | 6/1986 | Suzuki et al. | 501/92 |
| 4,613,490 | 9/1986 | Suzuki et al. | 423/344 |
| 4,643,859 | 2/1987 | Mitomo et al. | 264/65 |
| 4,753,716 | 6/1988 | Beatty et al. | 204/157.41 |
| 4,784,839 | 11/1988 | Bachelard et al. | 423/290 |
| 5,108,729 | 4/1992 | Gerhold et al. | 423/346 |
| 5,122,485 | 6/1992 | Akimune | 501/92 |

FOREIGN PATENT DOCUMENTS 63-230514  9/1988  Japan.

OTHER PUBLICATIONS

D. L. Segal, "A Review of Preparative Routes to Silicon Nitride Powders", *British Ceramic Transactions Journal*, vol. 85, No. 6, 1986.

*Primary Examiner*—Olik Chaudhuri
*Assistant Examiner*—Ken Horton
*Attorney, Agent, or Firm*—William R. Sharp

[57] ABSTRACT

A method of producing a composite ceramic powder is provided herein. A precursor product powder is first produced in a reactor from at least one carbide-forming reactant by heating the reactant(s) by means of combustion of a fuel, and the precursor product powder as collected from the reactor is heated in a nitrogen-containing atmosphere to produce a final product comprising a carbide compound as well as a nitride compound.

15 Claims, 3 Drawing Sheets

METHOD FOR PRODUCING A CERAMIC PRODUCT

BACKGROUND OF THE INVENTION

This invention relates to the field of ceramics and more particularly to a method for producing a ceramic product.

Ceramic products such as carbides and nitrides exhibit properties which make them particularly useful in the fabrication of highly stressed, wear resistant parts. For example, silicon carbide is noted for its excellent oxidation resistance, whereas silicon nitride is noted for its high strength. Because of such different, yet desirable properties, some efforts have been made to produce "composite" ceramic products for the purpose of combining such desirable properties in a single ceramic product. Although composite ceramic products, such as admixtures of a carbide and nitride, have been produced with some success, further development insofar as novel methods for producing such products would be desirable.

SUMMARY OF THE INVENTION

It is, therefore, an object of the invention to provide a novel method for producing a composite ceramic product.

The above object is realized by a method comprising: providing a reactor having a chamber defined therein which has a longitudinal axis and longitudinally separated upstream and downstream ends, wherein the chamber comprises a combustion zone and a reaction zone such that the combustion zone longitudinally extends from the upstream end to a boundary between the zones and such that the reaction zone longitudinally extends from the boundary to the downstream end; establishing a flow of a combustible mixture in the combustion zone so as to flow in a direction generally toward the reaction zone, wherein the combustible mixture comprises a mixture of a fuel and an oxidant; combusting the combustible mixture in the combustion zone to produce hot combustion products; injecting at least one reactant into the chamber at the boundary such that the hot combustion products carry the reactant(s) in the reaction zone toward the downstream end, wherein temperature conditions in at least a portion of the reaction zone are at least about 1400° C. and wherein the elemental molar ratio of carbon-to oxygen for the combination of the combustible mixture and reactant(s) is at least about 0.8:1, the reactant(s) being capable of reacting in the reaction zone to form a carbide compound, whereby a precursor product powder is produced in the reaction zone; collecting the precursor product powder; heating the thus collected product powder in a nitrogen-containing atmosphere at a temperature of about 1300° C. to about 1900° C. to produce a final product comprising the carbide compound as well as a nitride compound.

According to another aspect of the invention, there is provided a method comprising: providing a precursor product powder comprising silicon carbide and characterized by silicon in the amount of about 30 to about 75 weight percent, carbon in the amount of about 15 to about 50 weight percent, and oxygen in the amount of about 1 to about 30 weight percent, and which is further characterized by a ratio of the weight of carbon to the combined weights of silicon and oxygen of about 0.2:1 to about 1:1; and heating the precursor product powder in a nitrogen-containing atmosphere at a temperature of about 1300° C. to about 1900° C. to produce a final product comprising silicon carbide and silicon nitride.

It is particularly preferred in accordance with one embodiment of the invention to employ an atmosphere in the heating step comprising a mixture of nitrogen and hydrogen. As will be demonstrated in a subsequent example, a highly desirable product comprising the carbide and nitride compounds results.

DETAILED DESCRIPTION OF THE INVENTION

A preferred embodiment of the invention will now be described with reference to the drawings.

Figure 1:
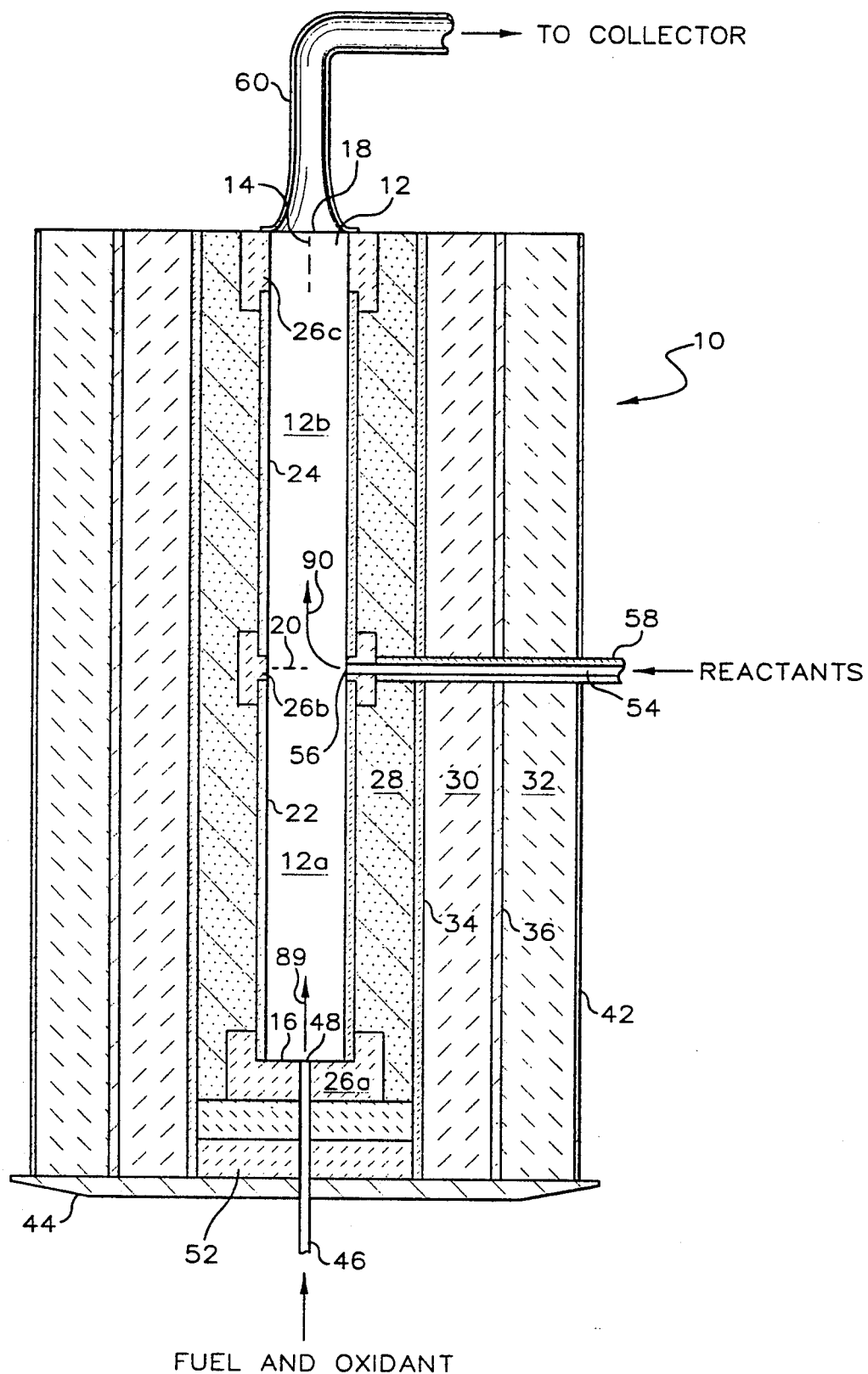
FIG. 1 is a cross-sectional view of a reactor for use in making the precursor product powder.

Referring to FIG. 1, there is shown a cross-sectional view of a reactor 10 having defined therein a chamber 12 which has a longitudinal axis 14 and longitudinally separated upstream and downstream ends 16 and 18, respectively. Chamber 12 includes a combustion zone 12a and a reaction zone 12b situated such that combustion zone 12a extends from upstream end 16 to an imaginary boundary 20 between the zones and such that the reaction zone 12b extends from boundary 20 to downstream end 18.

Chamber 12 is defined by refractory tubes 22 and 24 and also inserts 26a, b and c. Such tubes and inserts are preferably composed of a refractory material resistant to temperatures of at least 2000° C., such as zirconia, which is commercially available from Zircoa Products of Solon, Ohio.

As shown, there is provided several additional coaxially positioned layers of refractory material which are generally annular in shape and which surround tubes 22 and 24, including: layer 28, preferably comprising zirconia powder insulation, available from Zircar Products of Florida, N.Y., which allows for contraction and expansion of this layer; layer 30, which preferably comprises alumina-silica blanket insulation, commercially available under the trademark Fiberfrax ® from Carborundum of Niagara Falls, N.Y.; and layer 32 which may be of the same composition as layer 30. A refractory cylinder 34, preferably low density thermal insulating alumina available from Zircar Products of Florida, N.Y., is illustrated as separating layers 28 and 30, and a metal cylinder 36, most preferably composed of stainless steel separate layers 30 and 32. Cylinders 34 and 36 assist in providing structural support for the reactor.

The outermost refractory layer 32 is held in place by a cloth material 42, such as fiberglass, which wraps around the exterior surface of layer 32. The bottom end of the various layers are supported by a metal plate 44. The reactor is preferably oriented vertically as shown for the sake of operating convenience. If any of the refractory material breaks or cracks it tends to stay in position if the various layers and tubes are vertically positioned. Therefore, operation can sometimes continue despite such structural defects. Other reactor orientations are within the scope of the invention.

Nozzle 46 is connected to a source of fuel and oxidant and has an outlet end 48 which communicates with the combustion zone 12a of chamber 12 at a position closely adjacent to upstream end 16 of chamber 12. As shown, nozzle 46 is surrounded by refractory inserts 52 positioned near upstream end 16. Nozzle 54 is connected to a source of reactants, discussed later in detail, and extends through the various refractory layers to an outlet end 56 which communicates with chamber 12 at boundary 20 intermediate upstream and downstream ends 16 and 18. Nozzle 54 is surrounded by a refractory tube 58. Each of nozzles 46 and 54 may have associated cooling jackets (not shown in FIG. 1) if desired to cool the nozzles, which are preferably constructed of a metal such as stainless steel.

Proper positioning of the nozzles with respect to each other is an important consideration in optimizing operating efficiency and quality of the precursor product. It is desirable, for example, to position nozzle 54 far enough downstream so that substantially all of the free oxygen has reacted with the fuel to form combustion products. Such positioning of the nozzles means that there is substantially no free oxygen ($O_2$ in its free gaseous state, uncombined with any other component) at boundary 20, thus avoiding excessive oxidation of one of the reactants. It is furthermore desirable to position nozzle 54 sufficiently downstream from nozzle 46 to avoid the jet pump effect on gases flowing from nozzle 46. This effect tends to pull the reactants upstream rather than the intended downstream flow. However, in addition to the above considerations, nozzle 54 should be positioned sufficiently upstream to ensure that temperatures to which the reactants are exposed are conducive to the formation of the desired precursor product.

Also shown in FIG. 1 is conduit 60 which is connected at one end to reactor 10 so as to communicate with the downstream end 18 of chamber 12. Conduit 60 receives precursor product powder therethrough which then passes to a suitable collector, discussed further below. Conduit 60 in the illustrated embodiment not only functions to transport the product to the collector, but also functions as a heat exchanger. The outside of conduit 60 is exposed to a cooling means such as ambient air which allows heat transfer via both natural convection and radiation. Such heat transfer effects cooling of the precursor product powder as it flows through conduit 60. In addition, such cooling of the precursor product powder is desirable to prevent damage to the collector from excessively hot product. In instances where a cloth filter bag is used as the collector, conduit 60 should be of sufficient length to cool the product powder to a desired temperature, typically below about 100° C., before it enters the collector. Other types of collectors require less cooling. If desired, the cooling effect can be further enhanced by surrounding conduit 60 with a cooling coil or jacket having coolant fluid flowing therethrough.

With respect to materials for conduit 60, it is preferably that a non-metallic material be employed which will not add any undesirable metal contaminants to the product. If the precursor product contains silicon for example, quartz (silicon dioxide) is preferred so that essentially no additional contaminants will enter the product stream. Quartz is also a particularly preferred material because of its high emissivity and excellent thermal shock resistance.

The collector can be any suitable means of collecting the precursor product powder. One suitable collector, as discussed above, comprises a cloth filter bag connected to the downstream end of conduit 60. Other suitable collectors include metal filters, electrostatic precipitators and cyclone separators. Of course, regardless of what type of collector is used, a pressure differential should preferably be established, by a suitable pump, across the collector to draw the precursor product powder through conduit 60 and into the collector.

The various gas flows are preferably established and controlled by conventional equipment not shown in the drawings. Gas can be supplied by, for example, pressurized gas bottles. The gas can pass from such a pressurized container and through an orifice plate whose orifice is sized to achieve sonic velocity of the gas. Such a sonic velocity prevents pressure disturbances from traveling upstream, so that whatever happens downstream near the reactor will not affect the desired flow rate of gas. A pressure regulator can be employed to control the rate of flow of the gas.

A precursor product powder is produced in accordance with a preferred embodiment, described in detail hereafter with reference to the apparatus of FIG. 1, by reacting two reactants. A first reactant contains a first elemental component and a second reactant contains carbon as a second component. Each of the reactants contributes such components to the precursor product powder as is produced in the reactor. Although employing two reactants is preferred, it is possible to use only a single reactant containing, for example, the first elemental component in which case excess carbon from the fuel and/or single reactant would be the source of carbon for producing the precursor product powder.

According to certain broad aspects of the invention, the first component as contained in the first reactant may be any element capable of combining with carbon to form a carbide compound in the reactor, and also capable of combining with nitrogen to form a nitride compound in subsequent furnace processing discussed further below. For example, the first component may be a metal such as tungsten, chromium, titanium, zirconium or molybdenum. Halides of such metals are particularly suitable as the first reactant. Or, the first component may be a metalloid such as boron or silicon. First reactants having silicon as the first component are of particular interest in connection with the present invention.

Preferred silicon-containing first reactants which are compounds of silicon include silane ($SiH_4$) and substituted silanes. As used herein and in the appended claims, a substituted silane can be generally expressed by the formula SiABCD where each of A, B, C and D can be any element or combination of elements as long as at least one of A, B, C and D is not hydrogen, and where A, B, C and D can be the same or different. For example, any one of A, B, C and D can be selected from hydrogen, a halogen, an oxygen-containing group (i.e. $OSi(CH_3)_3$), a nitrogen-containing group (i.e. $NHSi(CH_3)_3$), an alkyl group, an aryl group, a silyl group, or a group containing multiple silicon atoms. Examples of such substituted silanes include: alkyl silanes such as methylsilane (($CH_3$)$SiH_3$), dimethylsilane (($CH_3$)$_2SiH_2$), trimethylsilane (($CH_3$)$_3SiH$) and tetramethylsilane ($Si(CH_3)_4$); halogenated silanes such as dichlorosilane ($H_2SiCl_2$); halogenated methylsilanes such as trimethyl silicon bromide ($(CH_3)_3SiBr$) and dichlorodimethylsilane ($(CH_3)_2SiCl_2$); siloxanes such as hexamethyldisiloxane ($(CH_3)_3SiOSi(CH_3)_3$); silazanes such as hexamethyldisilazane ($(CH_3)_3SiNHSi(CH_3)_3$); and silicon halide such as silicon tetrachloride ($SiCl_4$). Cyclic and polymeric silicon compounds are also within the scope of the invention. If desired, mixtures of any of the preceding silicon-containing compounds can be employed. Silane is the presently preferred silicon-containing reactant.

The carbon-containing second reactant is preferably a $C_1$–$C_9$ carbon compound such as an alcohol or a hydrocarbon. Suitable alcohols include ethanol and propanol. A hydrocarbon is presently most preferred and can be selected, by way of example, from the following group: methane, ethane, propane, butane, pentane, hexane, heptane, octane, nonane, ethylene, propylene, acetylene, benzene, toluene, cyclopropane, cyclobutane, cyclopentane, cyclohexane, and mixtures thereof. Although such $C_1$–$C_9$ carbon compounds are preferred, any carbon-containing reactant capable of reacting with the first reactant to form a carbide compound is within the scope of certain aspects of the invention.

The fuel, which is injected through nozzle 46, is preferably an unsaturated hydrocarbon (having at least one double or triple bond between carbon atoms), such as, for example, ethylene, propylene, butene, propadiene, butadiene, acetylene, propyne, butyne and mixtures thereof, and can be the same as or different than the hydrocarbon second reactant. Another preferred group of hydrocarbon fuels are cyclic hydrocarbons such as cyclopropane, cyclobutane, and mixtures thereof. Other types of fuels, such as solid fuels substantially comprising pure carbon, and fuel blends are within the scope of certain aspects of the invention so long as the desired temperature conditions and carbon to oxygen ratio, later discussed, are achieved in the reactor.

The oxidant employed should be capable of accepting electrons from the fuel and is preferably an oxygen-containing gas, most preferably pure oxygen. Gaseous mixtures which include oxygen as a single component, such as air, are within the scope of the invention.

In accordance with a preferred procedure for operating the illustrated apparatus, the reactor is preheated to normal operating temperatures. This is done to avoid thermal shock and possible breakage of various refractory materials. One method for this preheating stage involves initial electrical heating of the refractory layers with electrical rod heaters (not shown) and heating of chamber 12 with a coiled wire electrical heater (not shown) inserted into chamber 12, followed by establishment of a combustion flame in combustion zone 12a.

In any event, the combustion flame is established in combustion zone 12a by initiating a flow of gaseous fuel through nozzle 46. If the reactor has been preheated electrically, the fuel should spontaneously establish a flame by reacting with ambient air at downstream end 18 of chamber 12. If the combustion flame does not form, the fuel may be ignited with an appropriate ignition device. After the flame is established, a flow of air is initiated through nozzle 46 so as to produce a fuel/air mixture. This causes the flame to propagate upstream so that the flame establishes itself in combustion zone 12a. Propagation of the flame in this manner can be hazardous to an operator implementing the method such that adequate safety precautions are taken. The reactor is typically operated with this fuel/air mixture for a predetermined period, usually one-half hour to one hour.

Operation of the reactor with air as the oxidant is part of the preliminary start-up of the reactor to gradually heat the reactor.

A flow of pure oxygen is now commenced through nozzle 46 to replace the air. The flow of such oxygen is gradually increased and the flow of air gradually decreased until a fuel/oxygen combustible mixture is obtained. The combustion flame should be monitored visually through downstream end 18 to make sure that the flame does not flash back upstream so as to enter nozzle 46 and cause a potentially dangerous condition. Flashback can be prevented by providing a sufficiently high velocity of fuel and oxygen exiting nozzle 46.

A flow of the fuel/oxygen mixture is thus established in a direction generally parallel to axis 14 as indicated at 89, and the fuel and oxygen flow rates are set to be relatively fuel-rich in preparation for production of the precursor product powder. The elemental molar ratio of carbon to oxygen for the fuel/oxygen mixture is preferably at least about 0.7:1, more preferably in the range of about 0.8:1 to about 1.2:1, and most preferably in the range of about 0.9:1 to about 1.1:1. As used herein, the elemental molar ratio of carbon to oxygen means the molar ratio of carbon atoms to oxygen atoms. The residence time of the combustible mixture and hot combustion products formed therefrom in combustion zone 12a is typically about 5 to about 20 milliseconds, which is sufficient time to consume substantially all of the oxygen before reaching boundary 20 so as to avoid excessive oxidation of reactants. Temperature conditions in combustion zone 12a are typically about 1700° C. to about 2000° C.

The substantially gaseous reactants are now injected into chamber 12 at boundary 20, as indicated at 90, in a direction generally perpendicular to the chamber axis 14 such that the hot combustion products formed from combustion of the fuel carry the reactants toward downstream end 18. In the illustrated embodiment, the first and second reactants are premixed to give a desired molar ratio of silicon to carbon in the reactants of typically about 1:2 to about 1:4 and passed in admixture through nozzle 54 so as to exit outlet end 56 into chamber 12. If the first reactant employed is normally a liquid, such first reactant is placed in vapor form most conveniently by placing it in a temperature controlled bubbler and passing a purge gas therethrough.

Flow rates are adjusted so that the elemental molar ratio of carbon to oxygen for the combination of the reactants and fuel/oxygen mixture is at least about 0.8:1, but is preferably in the range of about 0.9:1 to about 1.5:1, and most preferably in the range of about 1:1 to about 1.3:1. These carbon to oxygen ratios produce an atmosphere in the reaction zone which is conducive to production of a precursor product powder having the desired composition which is discussed further below.

Temperature conditions for at least a portion of reaction zone 12b are at least about 1400° C., preferably in the range of about 1400° C. to about 1700° C., more preferably in the range of about 1500° C. to about 1600° C. The temperature conditions in the reactor can most conveniently be monitored by means of a thermocouple (not shown) positioned in one of the refractory layers. The temperature detected by the thermocouple can be correlated to actual temperature conditions in the reactor. Of course, a thermocouple can be positioned directly in the chamber 12, but this requires use of expensive materials such as platinum and/or rhodium which are still subject to deterioration due to the high temperatures in chamber 12.

Pressure conditions in reaction zone 12b are preferably at or near atmospheric pressure. Other operating pressures are within the scope of the invention.

In reaction zone 12b, a precursor product powder is formed from the reactants. The precursor product powder exits the reactor through downstream end 18 and passes into and through conduit 60 to the collector. After the desired amount of precursor product powder is collected, the reactor is shut down by first switching to air as the oxidant and then gradually decreasing the fuel/oxidant flow rates to provide gradual cooling of the reactor. It is sometimes desirable to run the reactor before shutdown for a period of time, i.e. 15 minutes, at full flow rates to burn out carbon deposits.

In the following description of the precursor product and in the claims appended hereto, it is to be understood that the term "weight percent" as applied to a component of a composition is based on the total weight of the composition.

The precursor product powder as collected from the reactor, in the case of silicon as the first elemental component, contains silicon carbide, silicon and carbon in addition to that in the silicon carbide, and oxygen. Such a precursor product powder is characterized by silicon in the amount of about 30 to about 75 weight percent, carbon in the amount of about 15 to about 50 weight percent, and oxygen in the amount of about 1 to about 30 weight percent, and is further characterized by the ratio of the weight of carbon to the combined weights of silicon and oxygen of about 0.2:1 to about 1:1, more preferably about 0.3:1 to about 0.7:1, most preferably about 0.3:1 to about 0.5:1.

Figure 2:
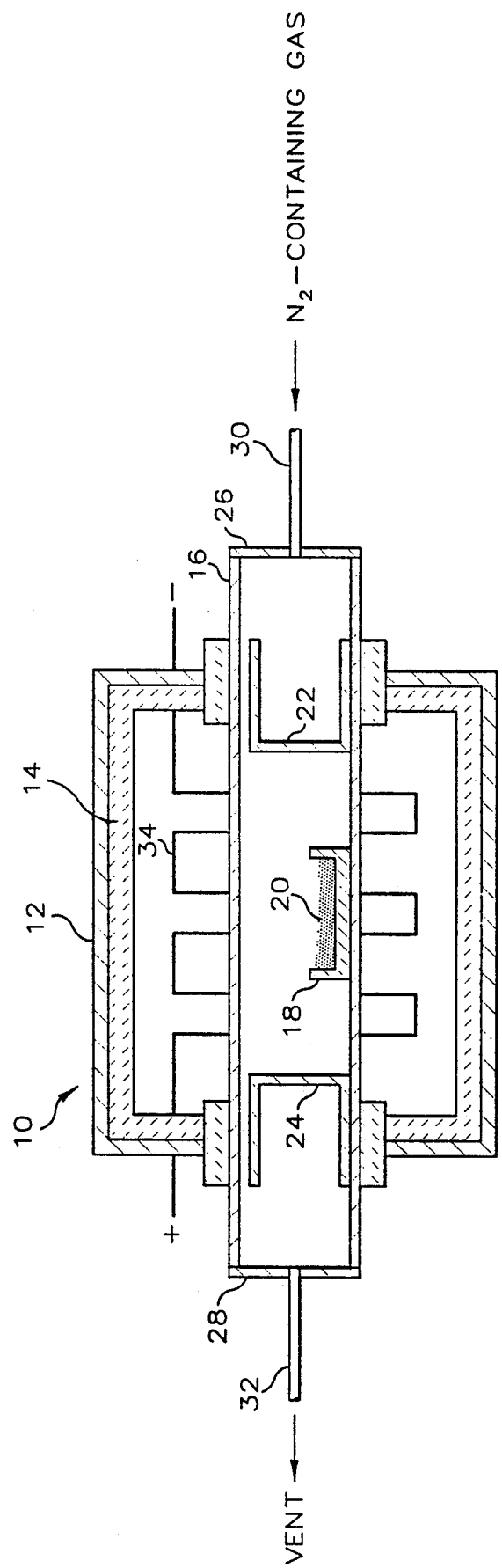
FIG. 2 is a schematic representation of a furnace in which the precursor product powder is heated to produce the final product.

The collected precursor product powder is now further processed in a suitable furnace, most preferably a tube furnace of the design shown in FIG. 2. The illustrated furnace 10 includes a suitable metal housing 12 lined with refractory insulation 14. A refractory tube 16 longitudinally extends through housing 12 and is adapted to receive therein a suitable sample tray 18, composed of for example graphite, for containing the precursor product powder 20. Also provided in tube 16 are a pair of refractory radiation blocks 22 and 24 positioned on either side of tray 18 to assist in preventing loss of heat through the ends of tube 16. Such radiation blocks can be filled with fibrous insulation (not shown) if desired to further assist in preventing heat loss. As shown, some clearance is provided between the radiation blocks and the interior surface of tube 16 to allow flow of gas through the tube. The ends of tube 16 are preferably closed by metal end plates 26 and 28 which can be clamped in position by means not shown. A gas inlet conduit 30 extends through end plate 26 so as to communicate with the interior of tube 16, and a gas outlet conduit 32 similarly extends through end plate 28 to also communicate with the interior of tube 16. Finally, the illustrated furnace includes at least one electrode 34 which surrounds tube 16 and which can be connected to a suitable source of electrical power to heat the contents of tube 16. As to materials of construction, the preferred refractory material is alumina and the preferred metallic material is steel.

The precursor product powder is preferably processed in furnace 10 as follows. First, the precursor product powder 20 is placed in tray 18 and positioned in tube 16 as shown. A flow of a nitrogen-containing gas is then commenced through gas inlet conduit 30 so as to flow through tube 16 and into and through gas outlet conduit 32. The exiting gas can simply be vented to the atmosphere. Such flow is continued for a sufficient time, typically about ½ hour, to purge tube 16 of air. As such gas flow continues, typically at a flow rate of about 0.5 to about 1 liter/minute in a tube furnace of the type employed in subsequent examples, power is then supplied to electrode 34 to heat the contents of tube 16 to a temperature of about 1300° C. to about 1900° C., most preferably about 1400° C. to about 1700° C. This desired temperature is preferably held for at least about 15 minutes, but more preferably for about 1 to about 3 hours, after which time electrical power to electrode 34 is shut off and the furnace is allowed to cool to room temperature. Gas flow is then terminated and tray 18 containing the final product is removed from furnace 10.

Although the above-described processing technique employing continuous gas flow through a tube furnace is preferred, it is within the scope of certain aspects of the invention to employ any other embodiment which can provide appropriate heating of the precursor product powder in a nitrogen-containing atmosphere. For example, rather than continuous gas flow, a static gaseous atmosphere could be provided which is periodically vented and replenished with additional gas.

As stated above, the gas employed according to the invention contains nitrogen. Such gas can consist essentially of nitrogen, or be mixed with other gaseous components. Most preferably, the nitrogen is premixed with hydrogen to provide a gas comprising nitrogen and hydrogen, and most preferably consisting essentially of nitrogen and hydrogen. Such a mixture of nitrogen and hydrogen produces a highly desirable final product as will be demonstrated in a subsequent example. The mixture of nitrogen and hydrogen most preferably has a molar ratio of nitrogen ($N_2$) to hydrogen ($H_2$) of about 1:1 to about 50:1, more preferably about 5:1 to about 25:1, and most preferably about 10:1 to about 15:1. The nitrogen and hydrogen can most conveniently be mixed in accordance with the illustrated embodiment by passing separate flows of nitrogen and hydrogen into gas inlet conduit 30.

The final product, as will be demonstrated in subsequent examples, comprises an intimate mixture of carbide and nitride as is revealed by X-ray diffraction analysis.

EXAMPLES

Specific examples will now be described to further illustrate the invention. These examples should not be construed to limit the invention in any manner.

In each of the following examples, various gaseous flow rates are given in gram moles/minute (abbreviated to gmol/min hereafter). Actual measurements of flow rate were taken volumetrically at room temperature and atmospheric pressure in units of liters/minute. These volumetric measurements were converted to gmol/min by assuming there are 24.45 liters/mole for any gas at 25° C. (room temperature) and at atmospheric pressure. All flow rates for gases below are undiluted with any other gases (i.e. carrier gases).

With respect to elemental analysis results given hereafter, the carbon and hydrogen weight percentages were obtained by means of combustion analysis. The silicon and oxygen percentages were obtained by neutron activation analysis. Weight percentage results are not normalized to 100 percent, and departure from 100 percent can be attributed to experimental error. Weight percentages of less than 1 weight percent (such as hydrogen) are not reported in the following examples.

With respect to terminology and notations used hereafter, it will be understood that all degree readings obtained by X-ray diffraction are for an angle of $2\theta$. The term "combustion C:O ratio" means the elemental molar ratio of carbon to oxygen for only the combustible mixture, whereas "overall C:O ratio" means the elemental molar ratio of carbon to oxygen for the combination of combustible mixture and reactants. The notation "Si—O" means silicon bonded to oxygen but denotes no particular molecular structure. Finally, the term "C:Si+O ratio" means the ratio of the carbon weight to the combined weights of silicon and oxygen.

EXAMPLE 1

The purpose of this example is to demonstrate the production of a product comprising silicon carbide and silicon nitride in accordance with the invention employing an atmosphere of nitrogen and hydrogen.

The reactor used in this example was substantially similar to the reactor shown in FIG. 1, but included two reactant nozzles located on opposite sides of the reactor chamber. A quartz conduit was provided having one end in communication with the downstream end of the reactor and the other end connected to a Dacron ® bag filter. In operation, a differential pressure was established across the filter which was designed to pull the precursor product powder through the conduit and into the bag filter. In actual practice, some of the precursor product powder does not reach the bag filter, but instead is left as a residue in the quartz conduit. It is this residue that was collected and employed in this example. Important dimensions of the reactor include the following: diameter of chamber 12—5.08 cm; overall length of chamber 12—53.3 cm; length of combustion zone 12a—27.9 cm; length of reaction zone 12b—25.4 cm; overall O.D of reactor 10—33.0 cm; I.D. of nozzle 46—0.343 cm; and I.D. of nozzle 54—0.175 cm.

A precursor product powder was produced as follows using the above-described reactor. The combustible mixture as injected through nozzle 46 included ethylene at a flow rate of 1.13 gmol/min and oxygen at a flow rate of 1.09 gmol/min to give a combustion C:O ratio of 1.03:1. Reactants as injected through nozzle 54 included silane at a flow rate of 0.059 gmol/min and ethylene at a flow rate of 0.090 gmol/min, to thereby give an overall C:O ratio of 1.12:1. The duration of this run was about 3 minutes, and 1.7 grams of a dark gray precursor product powder was collected. Elemental analysis of the precursor product powder revealed 62.4 weight percent silicon, 25.7 weight percent carbon and 17.8 weight percent oxygen, thus giving a C:Si+O weight ratio of 0.32:1. X-ray diffraction analysis of the precursor product powder resulted in a pattern having prominent peaks at 35°, 60° and 72°, indicating the presence of beta crystalline silicon carbide, and a less prominent broad peak between 20° and 30° which is taken to indicate carbon and Si—O. The precursor product powder was further found to have a surface area of 107.2 m²/g.

A sample of 0.50 grams of the above collected precursor product powder was then placed in a 13 cm×5 cm×1.3 cm graphite tray, which was placed in a 1 m long and 7 cm I.D. alumina tube of a tube furnace (Model 54434, Lindberg/A Unit of General Signal of Watertown, Wis.) of the general design shown in FIG. 2. Gas flow was then commenced through the inlet of the tube, including nitrogen at a flow rate of 0.85 liter/minute and hydrogen at a flow rate of 0.07 liter/minute so as to establish a flow of a nitrogen/hydrogen mixture through the tube. The molar ratio of nitrogen to hydrogen was, therefore, within the range of 10:1 to 15:1. After ½ hour of such flow to purge the tube of air, heating of the tube furnace was commenced at a rate of about 30° C./minute to reach the desired temperature of 1450° in 50 minutes. This temperature was held for 2 hours 24 minutes, during which time the flow of the nitrogen/hydrogen mixture continued except for a 3 minute period in which the hydrogen flow was temporarily shut off. The tube furnace was then allowed to cool down to room temperature, at which time the gas flow was terminated and the tray and final product were removed from the furnace. The final product (0.45 g) was observed to be fibrous and multicolored, containing black, white and gray-blue fibers.

Figure 3:
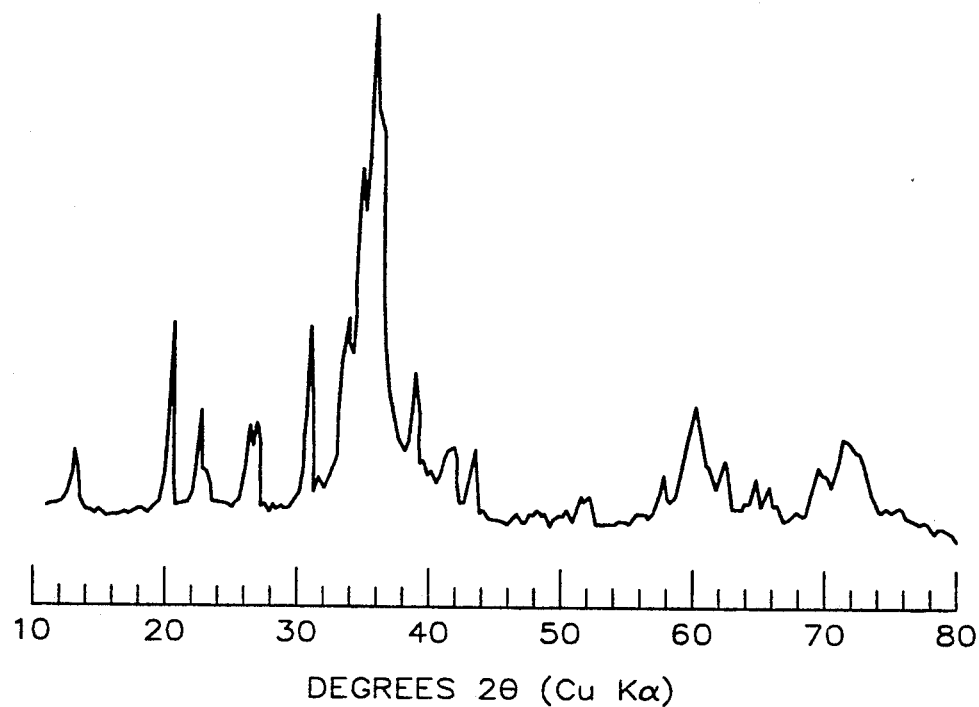
FIG. 3 is an X-ray diffraction pattern for a final product produced in Example 1 employing a nitrogen/hydrogen atmosphere in the furnace.

A sample of the final product was subjected to X-ray diffraction analysis. The resulting pattern, shown in FIG. 3, indicates peaks characteristic of beta crystalline silicon carbide (35°, 60°, 72°) and peaks characteristic of crystalline silicon nitride (i.e. 20.5°, 31°, 38.5°, 43° and 52°). Therefore, X-ray diffraction analysis is taken to indicate that the final product of this example contains an intimate mixture of silicon carbide and silicon nitride.

EXAMPLE 2

The purpose of this example is to demonstrate the production of a product employing a nitrogen atmosphere.

The reactor of Example 1 was employed to produce a precursor powder employing substantially the same procedure process conditions as described in Example 1, except that the duration of the run was 6 minutes and 5.18 grams of precursor product powder was collected. Elemental analysis of the precursor product powder, which was blue-gray in color, revealed 65.3 weight percent silicon, 26.6 weight percent carbon and 18.6 weight percent oxygen, thus giving a molar C:Si+0 weight ratio of 0.32:1. An X-ray diffraction pattern for the precursor product powder is similar to the pattern discussed in Example 1.

A sample of 1.01 grams of the precursor product powder was placed on a graphite tray in the tube furnace described in Example 1. A flow of nitrogen was commenced through the furnace at a flow rate of 0.82 liter/minute. After ½ hour, heating of the furnace was commenced at a rate of about 25° C./minute to reach a temperature of 1550° C. in one hour. This temperature was held for 1 hour, 4 minutes, followed by a gradual cooling to 1450° C. over 55 minutes, and then cooling to room temperature. Nitrogen gas flow was continued throughout the above heating and cool down procedure. The tray and final product were then removed from the furnace. The final product (0.81 g) was observed to be a light gray powder.

Figure 4:
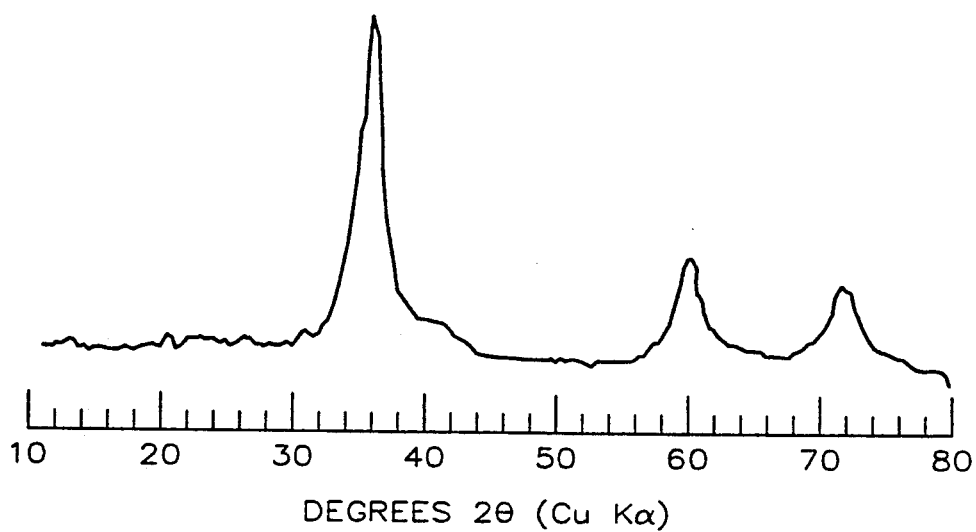
FIG. 4 is an X-ray diffraction pattern for a final product produced in Example 2 employing a nitrogen atmosphere in the furnace.

X-ray powder diffraction analysis of a sample of the above final product powder shows peaks (35°, 60° and 72°) characteristic of beta crystalline silicon carbide, as indicated in FIG. 4. The X-ray diffraction pattern also shows very small peaks at 20.5° and 31°, as well as a shoulder at between 40° and 43°, which are taken to indicate the presence of crystalline silicon nitride.

That which is claimed is:

1. A method comprising the steps of:
  providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;

establishing a flow of a combustible mixture in the combustion zone so as to flow in a direction generally toward the reaction zone, wherein the combustible mixture comprises a mixture of a fuel and an oxidant comprising oxygen;

combusting the combustible mixture in the combustion zone to produce hot combustion products;

injecting at least one reactant into said chamber at said boundary such that the hot combustion products carry said at least one reactant in the reaction zone toward said downstream end, wherein temperature conditions in at least a portion of the reaction zone are at least about 1400° C. and wherein the elemental molar ratio of carbon to oxygen for the combination of the combustible mixture and said at least one reactant is at least about 0.8:1, said at least one reactant being capable of reacting in the reaction zone to form silicon carbide, whereby a precursor product powder comprising the silicon carbide is produced in the reaction zone;

collecting the precursor product powder;

heating the thus collected precursor product powder in a nitrogen-containing atmosphere at a temperature of about 1300° C. to about 1900° C. to produce a final product comprising the silicon carbide as well as silicon nitride.

2. A method as recited in claim 1 wherein said atmosphere comprises a mixture of nitrogen and hydrogen.

3. A method as recited in claim 2 wherein the mixture of nitrogen and hydrogen has a molar ratio of nitrogen to hydrogen of about 1:1 to about 50:1.

4. A method as recited in claim 3 wherein said molar ratio of nitrogen to hydrogen is about 5:1 to about 25:1.

5. A method as recited in claim 1 wherein the precursor product powder is heated at a temperature of about 1400° C. to about 1700° C.

6. A method as recited in claim 5 wherein the precursor product powder is heated at said temperature for a time of at least about 15 minutes.

7. A method as recited in claim 6 wherein the precursor product powder is heated at said temperature for a time of about 1 to about 3 hours.

8. A method as recited in claim 7 wherein said heating step is carried out in a furnace and wherein during said heating step a substantially continuous flow of a nitrogen-containing gas is passed through the furnace.

9. A method as recited in claim 1 wherein the precursor product powder is characterized by silicon in the amount of about 30 to about 75 weight percent, carbon in the amount of about 15 to about 50 weight percent, and oxygen in the amount of about 1 to about 30 weight percent, and is further characterized by a ratio of the weight of carbon to the combined weights of silicon and oxygen of about 0.2:1 to about 1:1.

10. A method as recited in claim 9 wherein said ratio of carbon to silicon and oxygen is about 0.3:1 to about 0.7:1.

11. A method as recited in claim 10 wherein said ratio of carbon to silicon and oxygen is about 0.3:1 to about 0.5:1.

12. A method comprising the steps of:

providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;

establishing a flow of a combustible mixture in the combustion zone so as to flow in a direction generally toward the reaction zone, wherein the combustible mixture comprises a mixture of a fuel and an oxidant comprising oxygen;

combusting the combustible mixture in the combustion zone to produce hot combustion products;

injecting at least one reactant into said chamber at said boundary such that the hot combustion products carry said at least one reactant in the reaction zone toward said downstream end, wherein temperature conditions in at least a portion of the reaction zone are at least about 1400° C. and wherein the elemental molar ratio of carbon to oxygen for the combination of the combustible mixture and said at least one reactant is at least about 0.8:1, said at least one reactant being capable of reacting in the reaction zone to form silicon carbide, whereby a precursor product powder comprising the silicon carbide is produced in the reaction zone;

collecting the precursor product powder;

heating the thus collected precursor product powder in an atmosphere consisting essentially of a mixture of nitrogen and hydrogen at a temperature of about 1300° C. to about 1900° C. to produce a final product comprising the silicon carbide as well as silicon nitride, wherein the mixture of nitrogen and hydrogen has a molar ratio of nitrogen to hydrogen of about 10:1 to about 15:1.

13. A method as recited in claim 12 wherein said at least one reactant comprises a first reactant containing silicon and a second reactant containing carbon.

14. A method as recited in claim 13 wherein said elemental molar ratio of carbon to oxygen is about 0.9:1 to about 1.5:1.

15. A method as recited in claim 14 wherein said temperature conditions are in the range of about 1400° C. to about 1700° C.

* * * * *